US011873430B2

(12) United States Patent
Bouchard et al.

(10) Patent No.: US 11,873,430 B2
(45) Date of Patent: Jan. 16, 2024

(54) INHIBITOR FOR ALKALI AND ALKALINE EARTH METALS

(71) Applicant: HYDRO-QUÉBEC, Montréal (CA)

(72) Inventors: Patrick Bouchard, Shawinigan (CA); Josée Pronovost, Trois-Rivières (CA); Christiane Cossette, Trois-Rivières (CA); Serge Verreault, St-Tite (CA); Chantal Baril, Shawinigan (CA); Dominic Leblanc, Bécancour (CA); Karim Zaghib, Longueuil (CA)

(73) Assignee: HYDRO-QUÉBEC, Montréal (CA)

(*) Notice: Subject to any disclaimer, the term of this patent is extended or adjusted under 35 U.S.C. 154(b) by 733 days.

(21) Appl. No.: 16/975,279

(22) PCT Filed: Mar. 1, 2019

(86) PCT No.: PCT/CA2019/050246
§ 371 (c)(1),
(2) Date: Aug. 24, 2020

(87) PCT Pub. No.: WO2019/165557
PCT Pub. Date: Sep. 6, 2019

(65) Prior Publication Data
US 2020/0407637 A1 Dec. 31, 2020

(30) Foreign Application Priority Data
Mar. 1, 2018 (CA) ................ CA 2996961

(51) Int. Cl.
H01M 10/54 (2006.01)
H01M 6/52 (2006.01)
C22B 26/12 (2006.01)
C22B 7/00 (2006.01)
C09K 15/06 (2006.01)

(52) U.S. Cl.
CPC ............ C09K 15/06 (2013.01); C22B 7/006 (2013.01); C22B 26/12 (2013.01); H01M 6/52 (2013.01); H01M 10/54 (2013.01)

(58) Field of Classification Search
CPC ........ C09K 15/00; C09K 15/02; C09K 15/04; C09K 15/06; C22B 7/006; C22B 26/12; C22B 26/10; C22B 26/20; H01M 6/52; H01M 10/54
See application file for complete search history.

(56) References Cited

U.S. PATENT DOCUMENTS 4,254,089 A 3/1981 Levy
5,491,037 A 2/1996 Kawakami
2010/0303713 A1 12/2010 Zhang et al.
2013/0064756 A1 3/2013 Garrido Escudero
2015/0013499 A1* 1/2015 Asano ............... H01M 10/54 75/739
2017/0209905 A1 7/2017 Ito et al.
2018/0013181 A1 1/2018 Ho et al.

FOREIGN PATENT DOCUMENTS

| CN | 102802785 A | 11/2012 |
|---|---|---|
| CN | 102933488 A | 2/2013 |
| CN | 104370275 A | 2/2015 |
| CN | 107591582 A | 1/2018 |
| EP | 2 741 357 A1 | 6/2014 |
| IN | 107118225 A | 9/2017 |
| JP | 2000-173677 | 6/2000 |
| JP | 2003-322596 | 11/2003 |
| JP | 2004-155599 | 6/2004 |
| JP | 6-251805 | 12/2017 |
| WO | 2015/186637 | 10/2015 |
| WO | 2017197528 A1 | 11/2017 |
| WO | 2018006687 A1 | 1/2018 |

OTHER PUBLICATIONS

Extended European Search Report dated Aug. 26, 2021, issued by the European Patent Office in corresponding European Application No. 19760850.8-1108, (14 pages).
Alexander, M. D. "Reactions of the Alkali Metals With Water: A Novel Demonstration" Journal of Chemical Education, vol. 69, No. 5, May 1, 1992, XP055830525, pp. 418-419.
Office Action (Text of the First Office Action) dated Feb. 26, 2021, by the China National Intellectual Property Administration in corresponding Chinese Patent Application No. 201980013975.9, and an English Translation of the Office Action. (9 pages).
International Search Report (PCT/ISA/210) dated May 16, 2019, by the Canadian Patent Office as the International Searching Authority for International Application No. PCT/CA2019/050246.
Written Opinion (PCT/ISA/237) dated May 16, 2019, by the Canadian Patent Office as the International Searching Authority for International Application No. PCT/CA2019/050246.
Dulski, Thomas R., et al., A Manual for the Chemical Analysis of Metals, ASTM Manual Series MNL 25., Ann Arbor, MI (1996).
Furukawa, Tomohiro, et al., "Dissolution behavior of lithium compounds in ethanol", Nuclear Materials and Energy, 9 (2016), 286-291.
Office Action in Japanese Application No. 2020-545527, dated Aug. 24, 2023.

* cited by examiner

Primary Examiner — Timothy C Vanoy

(57) ABSTRACT

The technology described relates to a process for the safe dissolution of alkali metals, alkaline earth metals, and alloys predominantly comprising at least one thereof. The process comprises contacting the metal with a reaction inhibitor and water. In this process, the reaction inhibitor is selected from a hydrocarbon, a hydroxylated compound, and a mixture thereof. The uses of this process for the quantitative dissolution of metals and their analysis, for the destruction and stabilization of metallic residues, and for the recycling of batteries are also described.

26 Claims, 2 Drawing Sheets

INHIBITOR FOR ALKALI AND ALKALINE EARTH METALS

RELATED APPLICATION

This application claims priority, under the applicable law, to Canadian Patent Application No. 2,996,961 filed on Mar. 1, 2018, the content of which is incorporated herein by reference in its entirety and for all purposes.

TECHNICAL FIELD

The present application refers to the field of the quantitative and safe dissolution of alkali or alkaline earth metals, to the field of destruction and stabilization of alkali or alkaline earth metal residues, and to the field of recycling of alkali or alkaline earth metals.

BACKGROUND

Alkali metals (such as lithium, sodium, and potassium) have similar chemical properties and have a highly reducing valency electron. As a result, they react violently with water to produce hydrogen which can be explosive according to the reaction:

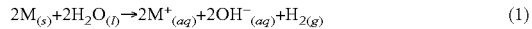
$$2M_{(s)} + 2H_2O_{(l)} \rightarrow 2M^+_{(aq)} + 2OH^-_{(aq)} + H_{2(g)} \quad (1)$$

Alkaline earth metals (such as magnesium, calcium, strontium, and barium) also react with water to produce hydrogen gas according to the following equation:

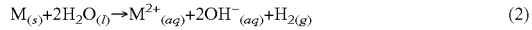
$$M_{(s)} + 2H_2O_{(l)} \rightarrow M^{2+}_{(aq)} + 2OH^-_{(aq)} + H_{2(g)} \quad (2)$$

Thus, calcium, strontium, and barium react violently in water. In both cases, the hydrogen released by these reactions is a highly flammable gas that can be explosive. The lower explosive or flammability limit of hydrogen is 4% while its upper limit is 75%. Hydrogen can ignite as soon as it is within this concentration range in air. Therefore, risks of explosion and projection are present during a hydrogen confinement.

It is possible to dissolve alkali metals by substituting water with methanol, ethanol, or butanol (see Dulski, T. R. "*A Manual for the Chemical Analysis of Metals, ASTM Manual Series MNL 25.*" Ann Arbor, MI (1996); and Furukawa, T., et al. Nuclear Materials and Energy 9 (2016): 286-291). The alkali metals can then break the O—H bond to give alcoholates. For example:

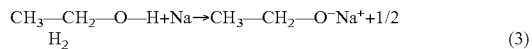
$$CH_3-CH_2-O-H + Na \rightarrow CH_3-CH_2-O^-Na^+ + 1/2 H_2 \quad (3)$$

For storage and transport purposes, alkali metals, such as lithium, are therefore usually immersed in mineral oil.

The synthesis of organomagnesium or Grignard reagents involves the dissolution of magnesium in an anhydrous solvent. For example, the solvents used can be ethers such as oxolane (tetrahydrofuran) or diethyl ether. In the synthesis of Grignard reagents, the solvent has the role of solvating the organomagnesium compound and stabilizing it. The synthesis of Grignard reagents is carried out according to the following reaction:

$$R-X + Mg^0 \rightarrow R-Mg-X \quad (4)$$

The synthesis of organolithium reagents is similar to that of organomagnesium reagents and involves dissolving lithium with anhydrous reagents and is carried out according to the following reaction:

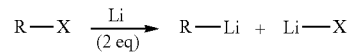
$$R-X \xrightarrow[\text{(2 eq)}]{Li} R-Li + Li-X \quad (5)$$

wherein X is a halogen, for example, Br, Cl, or I.

Water is the most available and least expensive oxidant. However, the reaction of alkali metals with water is not suitable for a safe dissolution. Therefore, there is an increased need for a safe method of aqueous alkali metals dissolution.

SUMMARY

According to a first aspect, the present description relates to a process for dissolving a metal, wherein the metal is selected from alkali metals, alkaline earth metals, and alloys mainly comprising at least one of these, the process comprising a step (a) of contacting the metal with a reaction inhibitor and water; wherein the reaction inhibitor is selected from a hydrocarbon, a hydroxylated compound, and a mixture comprising at least two thereof.

According to one embodiment, the hydrocarbon is of formula $C_nH_m$, where n and m are integers; n is between 5 and 40; and m is selected such that the molecule is stable and optionally comprises one or more unsaturations.

According to another embodiment, the hydroxylated compound is of formula $R(OH)_x$, where R is selected from $C_{1-8}$alkyl and $C_{2-3}$alkyl$(OC_{2-3}$alkyl$)_y$ groups, where x is between 1 and 4, and y is between 1 and 5, it being understood that the C:O ratio of the hydroxylated compound is in the range of from 1:1 to 3:1.

According to another embodiment, the hydroxylated compound is of formula $R(OH)_x$, where R and x are such that the formula defines a polyalkylene glycol having an average molecular weight between 300 and 800 g/mol or a polyvinyl alcohol having an average molecular weight between 7,000 and 101,000 g/mol, optionally substituted with one or more ester group(s).

According to another embodiment, the water is included in a light mineral oil and water emulsion.

According to another embodiment, the present description relates to a process as defined herein, wherein the inhibitor is a hydroxide of the metal, and step (a) comprises contacting the metal with a concentrated solution of the hydroxide of the metal in water.

According to another embodiment, the metal is selected from the alkali metals lithium, sodium, and potassium, and alloys mainly comprising one of these. For example, the metal is lithium. Alternatively, the metal is a lithium and magnesium or aluminum alloy, where lithium is predominant. According to an alternative embodiment, the metal is selected from magnesium, calcium, strontium, barium, and an alloy mainly comprising one of these.

According to another embodiment, the reaction inhibitor is a hydroxylated compound selected from propylene glycol, glycerol, ethylene glycol, ethanol, dipropylene glycol, tripropylene glycol, polyvinyl alcohol, polyethylene glycol, methoxypolyethylene glycol, and a mixture comprising at least two thereof. For example, the hydroxylated compound is propylene glycol or lithium hydroxide. According to another embodiment, the reaction inhibitor is a hydrocarbon mainly comprising linear, cyclic, or branched alkanes. According to another embodiment, the inhibitor is a mixture comprising at least one hydroxylated compound and a hydrocarbon.

According to another embodiment, the inhibitor is a hydroxide of the metal, and step (a) comprises contacting the metal with a concentrated solution of the hydroxide of the metal in water. For example, the hydroxide of the metal is lithium hydroxide.

According to another embodiment, the concentrated solution of the hydroxide of the metal has a concentration between 4 and 12.8% wt./vol (weight/volume %=g/100 ml). Alternatively, the concentrated solution of the hydroxide of the metal has a concentration between 6 and 12.8% wt./vol. Alternatively, the concentrated solution of the hydroxide of the metal has a concentration between 8 and 12.8% wt./vol. Alternatively, the concentrated solution of the hydroxide of the metal is a saturated solution.

According to another embodiment, the process comprises the complete or partial immersion of the metal in the reaction inhibitor followed by the addition of water or a light mineral oil and water emulsion.

In one embodiment, the metal to be dissolved is fixed to a non-reactive metal prior to the contacting step.

According to another aspect, the process is used for the quantitative dissolution of metals. According to one embodiment, said process further comprises a step of weighting the metal before contacting. The process can further comprise an optional step of separating the solution, and the quantitative analysis of the solution. The quantitative analysis of the solution can, for example, be carried out by inductively coupled plasma optical emission spectrometry (ICP-OES).

According to another aspect, the process is used for the destruction and stabilization of metallic residues. For example, metallic residues adhere to the surface of a piece of equipment. According to another embodiment, the process is carried out on the complete piece of equipment on which the metallic residues adhere.

According to another aspect, the process is used for recycling batteries. According to another embodiment, the process further comprises a step of dismantling or shredding the battery before contacting. Alternatively, the step of dismantling or shredding the battery and the contacting step are carried out simultaneously.

According to a last aspect, the process is used to recycle lithium in the form of LiOH or LiOH·$H_2O$ or converted in the form of $Li_2CO_3$ or of another lithium salt.

DETAILED DESCRIPTION

Figure 1:
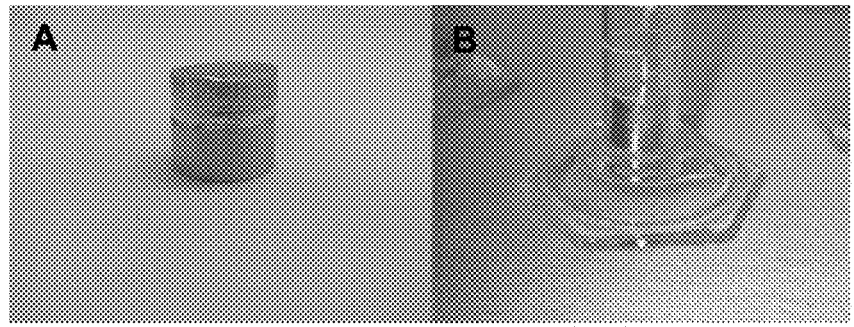
FIG. 1 presents images of the dissolution of a formed pellet showing: (A) a lithium pellet (top metal) fixed to a stainless steel pellet (bottom metal); and (B) the position of lithium (top metal) in the graduated cylinder for the quantitative dissolution of lithium, as described in Example 1(b).

All the technical and scientific terms and expressions used herein have the same definitions as those commonly understood by the person skilled in the art when relating to the present technology. The definition of some terms and expressions used is nevertheless provided below.

The term "about" as used herein means approximately, in the region of, and around. For example, when the term "about" is used in connection with a numerical value, it modifies it above and below by a variation of 10% or of 5% with respect to the nominal value. This term can also take into account, for example, the experimental error of a measuring apparatus or rounding.

When a range of values is mentioned in the present application, the lower and upper limits of the range are, unless otherwise indicated, always included in the definition.

The terms "predominantly" and "mainly" as used herein mean a concentration greater than 50% v/v or by weight, depending on whether the term is associated with a nominal value in volume or in weight, respectively.

As used herein, the term "hydrocarbon" refers to an oil or an oil(s)-based mixture consisting exclusively of carbon and hydrogen and therefore not comprising any other substitution group. The hydrocarbon mainly comprises linear, cyclic, or branched saturated alkanes. The hydrocarbon can come from petroleum distillation. Alternatively, it can have been synthetically produced. It is understood that, when the hydrocarbon comes from petroleum distillation, it can comprise in addition to the linear, cyclic, or branched saturated alkanes, which remain predominant, a mixture of different products in a smaller proportion, including partially unsaturated compounds or aromatics such as benzene and toluene.

As used herein, the term "hydroxylated compound" refers to organic or inorganic compounds comprising at least one hydroxyl functional group (—OH).

As used herein, the terms "alkyl" or "alkylene" refer to saturated hydrocarbon groups having between one and eight carbon atoms, including linear or branched groups. Examples of alkyl groups comprise, without limitation, methyl, ethyl, propyl, and so on. When the alkyl group is located between two functional groups, then the term "alkylene" can also be used, such as methylene, ethylene, propylene, and so on. The terms "$C_i$-$C_{ii}$alkyl" and "$C_i$-$C_{ii}$alkylene" refer respectively to an alkyl or alkylene group having from the number "i" to the number "ii" of carbon atom(s).

The present application describes a process for dissolving metals, wherein the metal is selected from alkali metals, alkaline earth metals, and alloys mainly comprising at least one of thereof.

For example, the metal is an alkali metal selected from lithium, sodium, and potassium. The metal can also be an alkaline earth metal selected from magnesium, calcium, strontium, and barium. Alternatively, the metal can also be an alloy mainly comprising an alkali or alkaline earth metal. According to a variant of interest, the metal is lithium. According to another variant of interest, the metal is an alloy of lithium and magnesium or aluminum, in which lithium is predominant.

The process includes a step of contacting the metal with a reaction inhibitor and water, the water optionally being in the form of a light mineral oil and water emulsion. In the process of the present application, the metal is fixed beforehand on a non-reactive metal, for example, on stainless steel. For example, the dissolution can be carried out on a sample (for example, a pellet) composed of a layer of metal to be dissolved fixed on a layer of non-reactive metal. The metal to be dissolved is placed on the top of the sample to prevent or reduce the risk of released hydrogen accumulating underneath it.

The reaction inhibitor can be selected from a hydrocarbon, a hydroxylated compound, and a mixture comprising at least two thereof. In the context of the present description, the hydrocarbon is of formula $C_nH_m$, where n and m are integers; n is between 5 and 40; and m is selected such that the molecule is stable and optionally comprises one or more unsaturations.

According to one alternative, the hydroxylated compound is of formula $R(OH)_x$, where R is selected from $C_{1-8}$alkyl and $C_{2-3}$alkyl$(OC_{2-3}$alkyl$)_y$ groups, where x is between 1 and 4, and y is between 1 and 5, it being understood that the C:O molar ratio of the hydroxylated compound is in the range of from 1:1 to 3:1. According to a second alternative, the hydroxylated compound is of formula $R(OH)_x$, where R and x are selected such that the formula defines a polyalkylene glycol having an average molecular weight between 300 and 800 g/mol or a polyvinyl alcohol having an average molecular weight between 7,000 and 101,000 g/mol, optionally substituted with one or more ester group(s).

Non-limiting examples of hydroxylated compounds include propylene glycol, glycerol, ethylene glycol, ethanol, dipropylene glycol, tripropylene glycol, polyvinyl alcohol, polyethylene glycol, methoxypolyethylene glycol, or a mixture comprising at least two thereof.

For example, the reaction inhibitor is propylene glycol or a paraffin oil. According to another variant, the reaction inhibitor is a mixture comprising at least one hydroxylated compound and a hydrocarbon. According to another example, the inhibitor further comprises methanol.

According to one example, the reaction inhibitor can further comprise one or more adjuvant(s) or additive(s), for example, to modify or improve the properties thereof, such as its viscosity. For example, the adjuvant can be glucose or another similar compound.

According to one example, the reaction inhibitor is a mixture including a hydroxylated compound present at a concentration between 1 and 99% v/v, preferably between 10 and 80% v/v, or between 30 and 60% v/v, or again about 50% v/v, upper and lower limits included.

According to another example, the step of contacting the metal with a reaction inhibitor and water (the water optionally being in the form of a light mineral oil and water emulsion) comprises a complete or partial immersion of the metal in the reaction inhibitor followed by the addition of water or the light mineral oil and water emulsion.

According to another example, the metal is immersed in a volume of reaction inhibitor equivalent to about 14 µl per milligram of metal to be dissolved. The water or light mineral oil and water emulsion can be added portionwise at regular intervals, for example, between about 0.10 and about 6.0 µl per milligram of metal to be dissolved per 15-minute periods, upper and lower limits included. Alternatively, it can be added continuously and at a controlled low flow rate, for example, at a rate between about 0.05% v/v and about 1% v/v per minute, upper and lower limits included.

According to another example, the water or light mineral oil and water emulsion can be added until the solution reaches a water concentration between about 50% v/v and about 90% v/v or until complete dissolution of the metal.

According to another variant of interest, the reaction inhibitor of the process as defined herein is a hydroxide of the metal, and step (a) comprises contacting the metal with a metal hydroxide concentrated solution in water. For example, the metal hydroxide is lithium hydroxide. For example, the concentrated solution of metal hydroxide has a concentration between about 4 and about 12.8% wt./vol, or between about 6 and about 12.8% wt./vol, or alternatively between about 8 and about 12.8% wt./vol, upper and lower limits included. Alternatively, the concentrated solution is a saturated solution.

According to another aspect, the present description also proposes the use of the process of the present application for the quantitative dissolution of metals. For example, the process can further comprise a step of weighting the metal prior to contacting, and a quantitative analysis of the solution step. The step of quantitatively analyzing the solution can be carried out, for example, by inductively coupled plasma optical emission spectrometry (ICP-OES).

According to another aspect, the present description also proposes the use of the process of the present application for the safe destruction and the stabilization of metallic residues. The process of the present application can allow, inter alia, to reduce the reaction rate and release of hydrogen gas, to reduce local hydrogen gas atmosphere, to prevent local heating, and/or to prevent reaching the lithium melting temperature. In addition, a slower release can allow, using adequate ventilation, to remain below the lower flammability limit of hydrogen gas, which is of about 4 vol %.

Metallic residues such as metallic lithium can also adhere to the surface of pieces of equipment. According to one embodiment, the complete piece of equipment on which the metallic residues adhere is treated by the process of the present application in order to dissolve or stabilize them.

According to another aspect, the present description also proposes the use of the process of the present application for recycling batteries. For example, the process can further comprise a step of dismantling or shredding the battery before the contacting step. Alternatively, the step of dismantling or shredding the battery can be carried out during the contacting step. For example, when using this process, the lithium oxidizes in the aqueous solution to form LiOH. The lithium can then be recycled from the aqueous LiOH solution in the form of $LiOH \cdot H_2O$ or converted in the form of $Li_2CO_3$ or another lithium salt. These compounds can then be reused in the production of electrochemically active materials such as, for example, $LiFePO_4$, $Li_4Ti_5O_{12}$, metallic lithium, or lithium salts used in the manufacture of liquid, solid, or gel electrolytes.

According to a last aspect, the reaction inhibitor can also be a lithium hydroxide solution. Solid LiOH is commercially available in its anhydrous form (LiOH) or monohydrate form ($LiOH \cdot H_2O$). The maximum solubility of anhydrous LiOH in water is about 128 g/L at a temperature of 20° C. (concentration equivalent to about 12.8% wt./vol). The dissolution of metallic lithium in a concentrated LiOH aqueous solution occurs very slowly and therefore, it can be used to safely solubilize metallic lithium. The solution resulting from this controlled dissolution can then be used to recover the lithium in a form having a substantially significant commercial value (such as anhydrous LiOH, $LiOH \cdot H_2O$, or $Li_2CO_3$). For example, one advantage of using this inhibitor comes from its high chemical purity since no other chemical is introduced into the process. This inhibitor can also be used in the destruction of metallic lithium residues, for the recycling of metallic lithium batteries, or for the purposes of quantitative chemical analysis of impurities contained in lithium and/or the determination of the purity thereof.

EXAMPLES

The following examples are presented for illustrative purposes and should not be construed as further limiting the scope of the invention as described.

Example 1—Quantitative Dissolution of Lithium for Chemical Analysis Using Propylene Glycol as a Reaction Inhibitor (a) Sample Preparation The lithium sample to be dissolved was prepared in an anhydrous chamber having a dew point below −40° C. A clean and dry stainless steel pellet was first weighed on an analytical balance and inserted into a pellet mold (For example, GS03000 13 mm Evacuable Pellet Die, from Specac Brilliant Spectroscopy™) so that the unpolished surface is in contact with the sample to promote the adhesion of lithium on the stainless steel pellet. A metallic lithium foil was then removed and inserted into the pellet mold. A clean and dry high molecular weight polyethylene (UHMW-PE) pellet (12.90 mm×6.0 mm) was then inserted into the pellet mold so that its polished side was in contact with the lithium sample, thus allowing the UHMW-PE pellet to be easily peeled off. The mold assembly was then carried out and placed in a manual hydraulic press (YLJ-15, MTI Corporation). A vacuum line was connected to the base of the pellet mold to remove air from the sample and the mold was placed under vacuum for one minute. A pressure of 80 Bars was applied under vacuum for one minute. Once the pressure was released, the vacuum was maintained for one additional minute. The lithium pellet thus formed, therefore ended up between a stainless steel pellet and a UHMW-PE pellet.

The pellet was then ejected from the die using an extraction ring and the hydraulic press. During extraction, the UHMW-PE pellet was peeled off using a cylindrical tool. The sample was then weighed on an analytical balance and the weight of the stainless steel pellet was subtracted.

The same method was also carried out with an alloy comprising 90% by weight of lithium and 10% of magnesium for comparison purposes.

(b) Quantitative Dissolution of the Sample

The lithium or lithium-based alloy pellet thus formed on a stainless steel pellet (see FIG. 1A) was inserted into a 25 mL graduated cylinder. The lithium pellet was placed upward to promote the release of hydrogen bubbles during the dissolution (see FIG. 1B). The dissolution was carried out in a cylinder in order to obtain a column of liquid which captures the extracted residual lithium. Using the process of the present example, the release of hydrogen occurs gradually in order to avoid reaching a high local concentration of flammable hydrogen and limiting the increase in temperature at the lithium surface, thus reducing the fire or explosion risks.

A volume of 5 ml of propylene glycol was added. In order to monitor the dissolution reaction, 1 ml of ultrapure water was added every 15 minutes for a period of about 6 hours to obtain a total water volume of about 25 ml. The sample was then allowed to react until complete dissolution and until there was no further formation of hydrogen bubbles.

The solution resulting from the dissolution was transferred to a 50 ml volumetric flask and acidified with 4.15 ml of concentrated hydrochloric acid. Concentrated solutions of hydrochloric acid (2.50 ml) and nitric acid (2.50 ml) were then added (final concentrations of 5% v/v, respectively). The volume of the flask was filled up to the ring graduation marking with ultrapure water. The solution was thus acidified to obtain the same matrix as the standards for the ICP-OES analysis.

(c) Quantitative Analysis of Lithium, Magnesium, and Impurities Contained in Metallic Lithium or in a Lithium-Based Alloy by ICP-OES The solution is then analyzed by ICP-OES. This method makes it possible to quantify magnesium and lithium at a high concentration using a calibration curve. This analysis therefore makes it possible, among other things, to quantify the lithium or other in a lithium-based alloy. It also makes it possible to quantify the impurities contained in metallic lithium or in a lithium-based alloy. The impurities can, for example, include calcium, chromium, iron, potassium, magnesium, manganese, sodium, nickel, silicon, strontium, and/or zinc.

When the method is used to quantify the impurities contained in metallic lithium, the blank and standards are prepared with the same concentration of propylene glycol and lithium as the samples to be analyzed to obtain the same matrix as the analyzed samples (matrix matching).

Example 2—Quantitative Dissolution of Lithium for Chemical Analysis Using Mineral Oil as a Reaction Inhibitor A lithium sample was prepared according to the method presented in Example 1(a). The sample was then dissolved according to the method presented in Example 1(b) by replacing the propylene glycol with light mineral oil. Again, with this example, the lithium pellet was deposited in a graduated cylinder. The lithium was placed upward to promote the release the hydrogen bubbles. Light mineral oil was then added to completely immerse the lithium pellet. Gradually, ultrapure water or an emulsion of ultrapure water and mineral oil was added to control the oxidation reaction of metallic lithium and the hydrogen evolution. Subsequently, the solution was left to settle and was decanted. The ICP-OES analysis is then performed.

Figure 2:
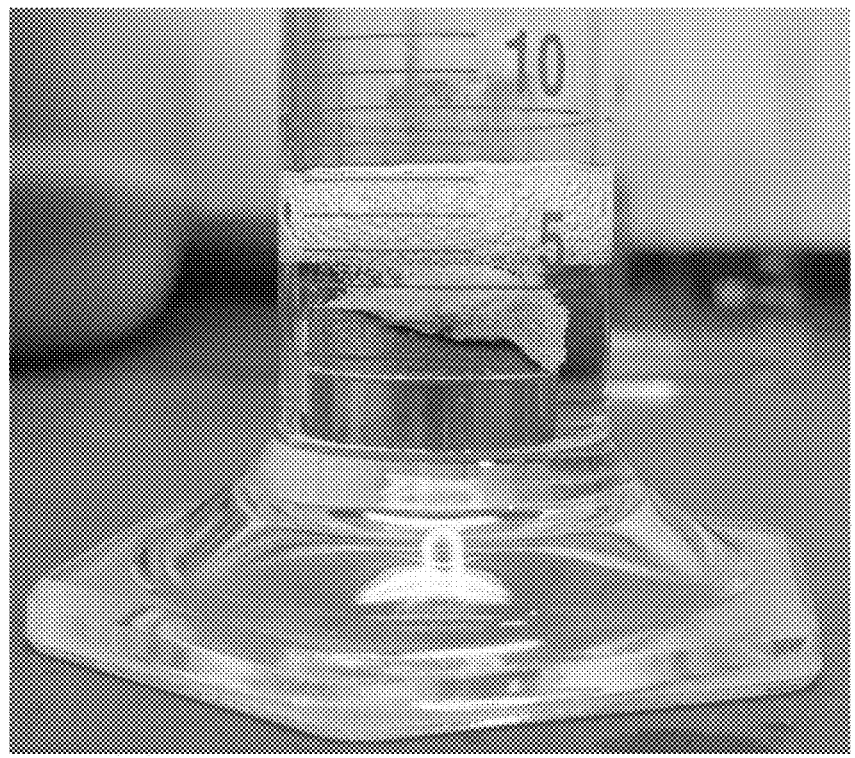
FIG. 2 presents an image of the dissolution in mineral oil of a lithium pellet (top metal) fixed to a stainless steel pellet (bottom metal), as described in Example 2.

The dissolution in mineral oil of the lithium pellet (top metal) fixed to the stainless steel pellet (bottom metal) was carried out (see FIG. 2). When adding water or a water-oil emulsion, it was possible to observe the formation of a white precipitate of lithium hydroxide not soluble in mineral oil (see FIG. 2). The use of mineral oil as a reaction inhibitor allows the slow release of flammable hydrogen without local temperature rise, thereby improving the safety of the process.

Example 3—Safe Destruction and Stabilization of Lithium Residues

The reaction inhibitor can be used to safely destroy and stabilize residues of alkali metals, alkaline earth metals, and alloys including at least one thereof, adhering or not to a piece of equipment.

For example, metallic lithium that has adhered to a piece of equipment is eliminated. Given the amount of metallic lithium to be dissolved, the complete piece of equipment is immersed in a washing solution containing propylene glycol and water in a volume ratio of 1:1. The alkali metal removal process is considered complete once the formation of hydrogen bubbles has stopped, thus indicating complete dissolution of metallic lithium in the form of lithium hydroxide (LiOH) according to the following reaction:

$$2\ Li + 2H_2O \rightarrow 2LiOH + H_2 \qquad (6)$$

The process described in this example makes it possible to reduce the reaction and $H_2$ release rate, to reduce the local concentration of flammable $H_2$, to avoid local heating and to avoid reaching the melting temperature of Li. A slower release allows to remain below the lower flammability limit of hydrogen gas which is about 4% by volume and therefore to safely destroy the residues.

Example 4—Recycling Lithium in Lithium Metal Batteries

The reaction inhibitor can be used to render inactive the lithium or lithium-based alloy contained in a primary or secondary battery, in order to recover commercially valuable materials and/or to recycle them. For example, the recycling process comprises shredding batteries by grinding in presence of an aqueous solution containing the organic inhibitor. When using this process lithium oxidizes in aqueous solution to form LiOH. Once the lithium is completely dissolved in this form, the shredded (and non-reactive) materials are rinsed with water to remove traces of LiOH. The lithium can then be recycled from the aqueous solution of LiOH in the form of LiOH·$H_2O$ or converted in the form of $Li_2CO_3$ or another lithium salt. These compounds can then be reused for the production of electrochemically active materials such as, for example, $LiFePO_4$, $Li_4Ti_5O_{12}$, or metallic lithium, or for the production of lithium salts used in the manufacture of liquid, solid or gel electrolytes.

Example 5—Controlled Dissolution of Metallic Lithium in a Lithium Hydroxide Solution The reaction inhibitor can also be a concentrated solution of lithium hydroxide. The dissolution of metallic lithium in a concentrated aqueous LiOH solution occurs very slowly, it can therefore be used to safely solubilize metallic lithium. The solution resulting from this controlled dissolution can then be used to recover the lithium in a form having a significant commercial value (such as anhydrous LiOH, LiOH·$H_2O$, or $Li_2CO_3$). This inhibitor can also be used for the destruction of metallic lithium residues, for the recycling of metallic lithium batteries, or for the quantitative chemical analysis of the impurities contained in lithium.

(a) Dissolution in a Saturated Solution of Lithium Hydroxide

The controlled dissolution of a metallic lithium sample as prepared in Example 1(a) was carried out by adding, initially, 5 ml of a saturated solution of lithium hydroxide (12.8% wt./vol). Then, water was added gradually in portions at regular intervals (about 1 ml per 15 minutes for 0.350 g of metal) to control the dissolution rate of the metal. To complete the dissolution reaction, a total amount of 18 ml of water was added, corresponding to a final concentration of 8.03% wt./vol.

Figure 3:
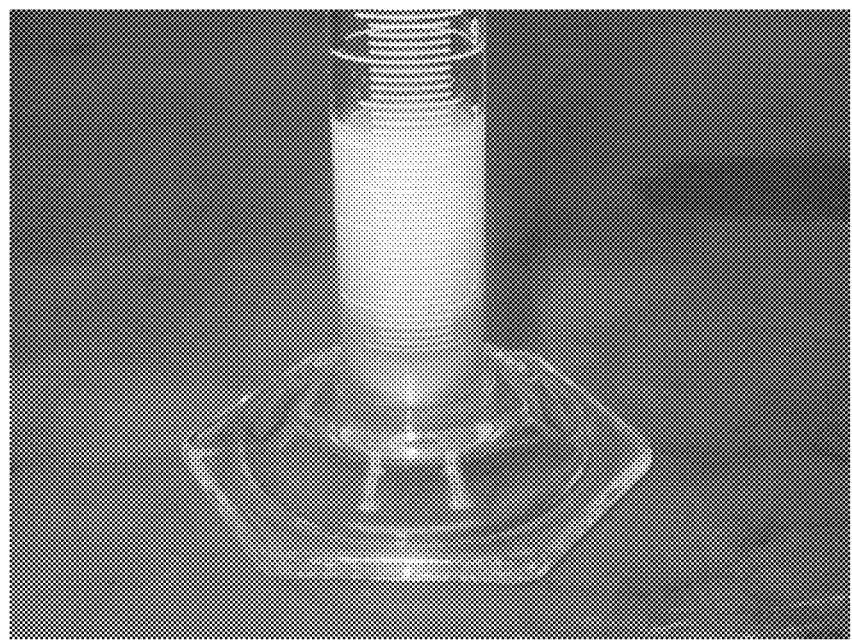
FIG. 3 presents an image of the dissolution of a lithium pellet fixed to a stainless steel pellet in a saturated lithium hydroxide solution, as described in Example 5(a).

FIG. 3 shows an image of the controlled dissolution of metallic lithium in a saturated lithium hydroxide solution (12.8% wt./vol LiOH) as described in this example. The metallic lithium was held at the bottom of the solution by a stainless steel pellet on which the metal was pressed, as described in Example 1(a). Using the process of this example, the evolution of hydrogen occurs slowly, and the lithium does not heat up.

(b) Dissolution in an Unsaturated Solution of Lithium Hydroxide (6.4% Wt./Vol LiOH)

The controlled solution of a metallic lithium sample, as prepared in Example 1(a) was carried out according to the method described in Example 5(a), except that the saturated solution of LiOH is replaced by 5 ml of a solution containing 6.4% wt./vol LiOH (64 g/L). Using the process of the present example, the reaction is more violent and faster. The solution warms up slightly and the hydrogen release is more pronounced. In order to complete the lithium dissolution reaction, a total amount of water of 14 ml was added per portion at regular intervals (i.e., about 1 ml of water per 15 minutes for 0.350 g of metal). The final concentration obtained was 8.04% wt./vol.

Numerous modifications could be made to one or other of the embodiments described above without departing from the scope of the present invention as contemplated. Any references, patents or scientific literature documents referred to in the present document are incorporated herein by reference in their entirety for all purposes.

The invention claimed is:

1. Process for the dissolution of a metal, in which the metal is selected from alkali metals, alkaline earth metals, and alloys comprising at least 50% by weight of at least one thereof, the process comprising, in order, the steps of:
   a) completely or partially immersing the metal in a reaction inhibitor; and
   b) adding water, wherein the reaction inhibitor is selected from a hydrocarbon, a hydroxylated compound, and a mixture comprising at least two thereof.

2. The process of claim 1, wherein the metal is selected from lithium, sodium, potassium, and an alloy comprising at least 50% by weight of one thereof.

3. The process of claim 2, wherein the metal is lithium, or an alloy of lithium and magnesium or aluminum, where lithium is predominant.

4. The process of claim 1, wherein the metal is selected from magnesium, calcium, strontium, barium, and an alloy comprising at least 50% by weight of one thereof.

5. The process of claim 1, wherein the hydroxylated compound is of formula:
   $R(OH)_x$, where R is selected from $C_{1-8}$alkyl and $C_{2-3}$alkyl $(OC_{2-3}alkyl)_y$ groups, where x is between 1 and 4, and y is between 1 and 5, and the C:O ratio of the hydroxylated compound is in the range of from 1:1 to 3:1; or
   $R(OH)_x$, where R and x are such that the formula defines a polyalkylene glycol having an average molecular weight between 300 and 800 g/mol or a polyvinyl alcohol having an average molecular weight between 7,000 and 101,000 g/mol, optionally substituted with one or more ester group(s).

6. The process of claim 5, wherein the hydroxylated compound is selected from propylene glycol, dipropylene glycol, tripropylene glycol, glycerol, ethylene glycol, ethanol, polyvinyl alcohol, polyethylene glycol (PEG), methoxypolyethylene glycol (MEG), and a mixture comprising at least two thereof.

7. The process of claim 1, wherein the reaction inhibitor comprises propylene glycol.

8. The process of claim 1, wherein the reaction inhibitor further comprises methanol.

9. The process of claim 1, wherein the reaction inhibitor is a mixture comprising a hydroxylated compound present at a concentration between 1 and 99% v/v, or between 10 and 80% v/v, or between 30 and 60% v/v, or is about 50% v/v.

10. The process of claim 1, wherein the hydrocarbon is of formula $C_nH_m$, where n and m are integers; n is between 5 and 40; and m is selected such that the molecule is stable and optionally comprises one or more unsaturation(s), wherein the hydrocarbon comprises at least 50% by volume of linear, cyclic, or branched alkanes.

11. The process of claim 1, wherein the inhibitor is a mixture comprising at least one hydroxylated compound and a hydrocarbon.

12. The process of claim 1, wherein the water is comprised in a light mineral oil and water emulsion.

13. The process of claim 1, wherein the water or the light mineral oil and water emulsion is added continuously and at a controlled low rate or added portionwise at regular intervals.

14. The process of claim 13, wherein the water or the light mineral oil and water emulsion is added until the solution reaches a water concentration between 50% v/v and 90% v/v or until complete dissolution of the metal.

15. The process of claim 13, wherein the water or the light mineral oil and water emulsion is added continuously and at a controlled low rate of from about 0.05% v/v to about 1% v/v per minute.

16. The process of claim 13, wherein the water or the light mineral oil and water emulsion is added by portions of 0.10 to 6.0 µl per milligram of metal to be dissolved per 15-minute periods.

17. The process of claim 1, wherein the reaction inhibitor is a hydroxide of the metal, and step (a) comprises contacting the metal with a concentrated solution of the hydroxide of the metal in water.

18. The process of claim 17, wherein the concentrated solution of the hydroxide of the metal is a solution of lithium hydroxide in water having a concentration between 4 and 12.8% wt./vol, or between 6 and 12.8% wt./vol, or between 8 and 12.8% wt./vol, or wherein the concentrated solution is a saturated solution.

19. The process of claim 18, wherein the lithium hydroxide in water is at a concentration between 6 and 12.8% wt./vol.

20. The process of claim 18, wherein the lithium hydroxide in water is at a concentration between 8 and 12.8% wt./vol.

21. The process of claim 18, wherein the lithium hydroxide in water is a saturated solution.

22. The process of claim 1, wherein the metal is fixed to a non-reactive metal prior to the contacting step.

23. The process of claim 1, wherein the dissolution is quantitative, and wherein the step (a) optionally comprises a step of weighting the metal prior to the contacting, the process further comprising the steps of:
 (b) optional separation of the solution; and
 (c) quantitative analysis of the solution optionally carried out by inductively coupled plasma optical emission spectrometry (ICP-OES).

24. The process of claim 1, wherein the metal is in the form of metallic residues adhering to the surface of a piece of equipment, wherein the step (a) is optionally carried out on the complete piece of equipment to which the metallic residues adhere, and said process is used for the destruction and stabilization of metallic residues.

25. The process of claim 1, wherein said process is used for recycling batteries, and said process optionally comprises a step of dismantling or shredding the battery before or during the contacting step.

26. A process for recycling lithium comprising the steps of a process as defined in claim 1, the lithium being recycled in the form of LiOH or LiOH·H$_2$O, or converted in the form of Li$_2$CO$_3$, or another lithium salt.

* * * * *